United States Patent [19]

Vaughn

[11] 3,976,337
[45] Aug. 24, 1976

[54] STRIKER BAR FOR CLEANING THE TRACKS OF TRACK-TYPE VEHICLES

[75] Inventor: Kennith E. Vaughn, Creve Coeur, Ill.

[73] Assignee: Caterpillar Tractor Co., Peoria, Ill.

[22] Filed: Mar. 17, 1975

[21] Appl. No.: 558,878

[52] U.S. Cl. .................................................. 305/12
[51] Int. Cl.² ............................................. B60S 1/62
[58] Field of Search .......................... 305/11, 12, 13

[56] References Cited
UNITED STATES PATENTS

| | | | |
|---|---|---|---|
| 1,741,878 | 12/1929 | Rasmussen | 305/12 |
| 1,992,702 | 2/1935 | Koop | 305/12 |
| 2,560,307 | 7/1951 | Slemmons | 305/12 |
| 2,661,249 | 12/1953 | Bonmartini | 305/12 |
| 2,780,500 | 2/1957 | Lawson | 305/12 |
| 2,982,584 | 5/1961 | Uemura | 305/12 |

*Primary Examiner*—M. H. Wood, Jr.
*Assistant Examiner*—John A. Carroll
*Attorney, Agent, or Firm*—Phillips, Moore, Weissenberger, Lempio & Strabala

[57] ABSTRACT

A track-type vehicle, such as a crawler tractor, comprises a pair of endless track assemblies mounted on either side thereof. Each track assembly is entrained over a sprocket and a striker bar is secured on a frame of the vehicle and extends outwardly in close proximity to the sprocket and track assembly for breaking-up material carried by the track assembly thereby.

11 Claims, 2 Drawing Figures

STRIKER BAR FOR CLEANING THE TRACKS OF TRACK-TYPE VEHICLES

BACKGROUND OF THE INVENTION

A track-type tractor comprises a pair of endless tracks mounted on either side thereof to propel the tractor during construction operations. Each track assembly is normally driven by a sprocket rotatably mounted on the frame of the tractor and driven by a final drive enclosed by a housing also secured to the frame. During certain conditions of tractor operation, dirt and other debris tend to impact between the track assembly and the housing to thus increase the tractive effort of the tractor and to cause undue wear thereat.

SUMMARY OF THIS INVENTION

An object of this invention is to overcome the above briefly described problems by providing an economical and non-complex striker bar means for breaking-up materials carried by the track assembly of an endless track-type vehicle to prevent compacting thereof between the track assembly and structural components of the vehicle. The striker bar means is secured on a frame of the vehicle and extends outwardly therefrom in close proximity to and internally of the track assembly. In the preferred embodiment of this invention, such striker bar means constitutes a single blade extending downwardly at an acute angle relative to the rotational axis of a sprocket rotatably mounted on the frame for driving the track assembly.

BRIEF DESCRIPTION OF THE DRAWINGS

Other objects of this invention will become apparent from the following description and accompanying drawings wherein.

DETAILED DESCRIPTION

The drawings partially illustrate a track-type vehicle, such as crawler tractor or excavator, comprising a pair of endless track assemblies 10 (one shown) mounted on either side thereof in a conventional manner. The forward end of each track assembly is entrained about an idler (not shown) rotatably mounted on a track roller frame 11. The illustrated rearward end of the track assembly is entrained over a sprocket 12 rotatably mounted on a main frame of the vehicle in a conventional manner for rotation about an axis X thereof.

Figure 1:
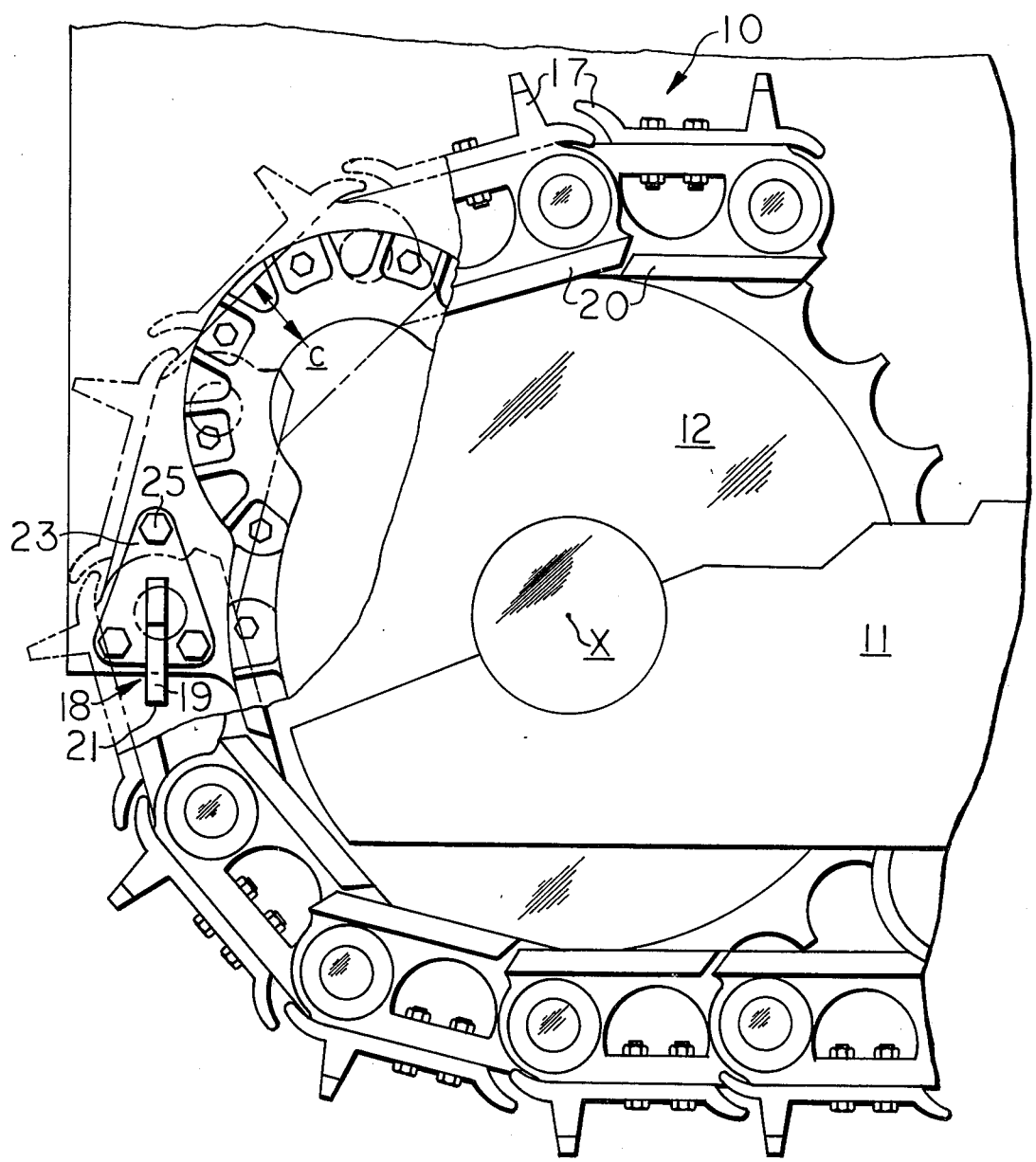
FIG. 1 is a side elevational view of a rearward portion of a track-type vehicle having a striker bar means of this invention secured on a frame thereof.
Figure 2:
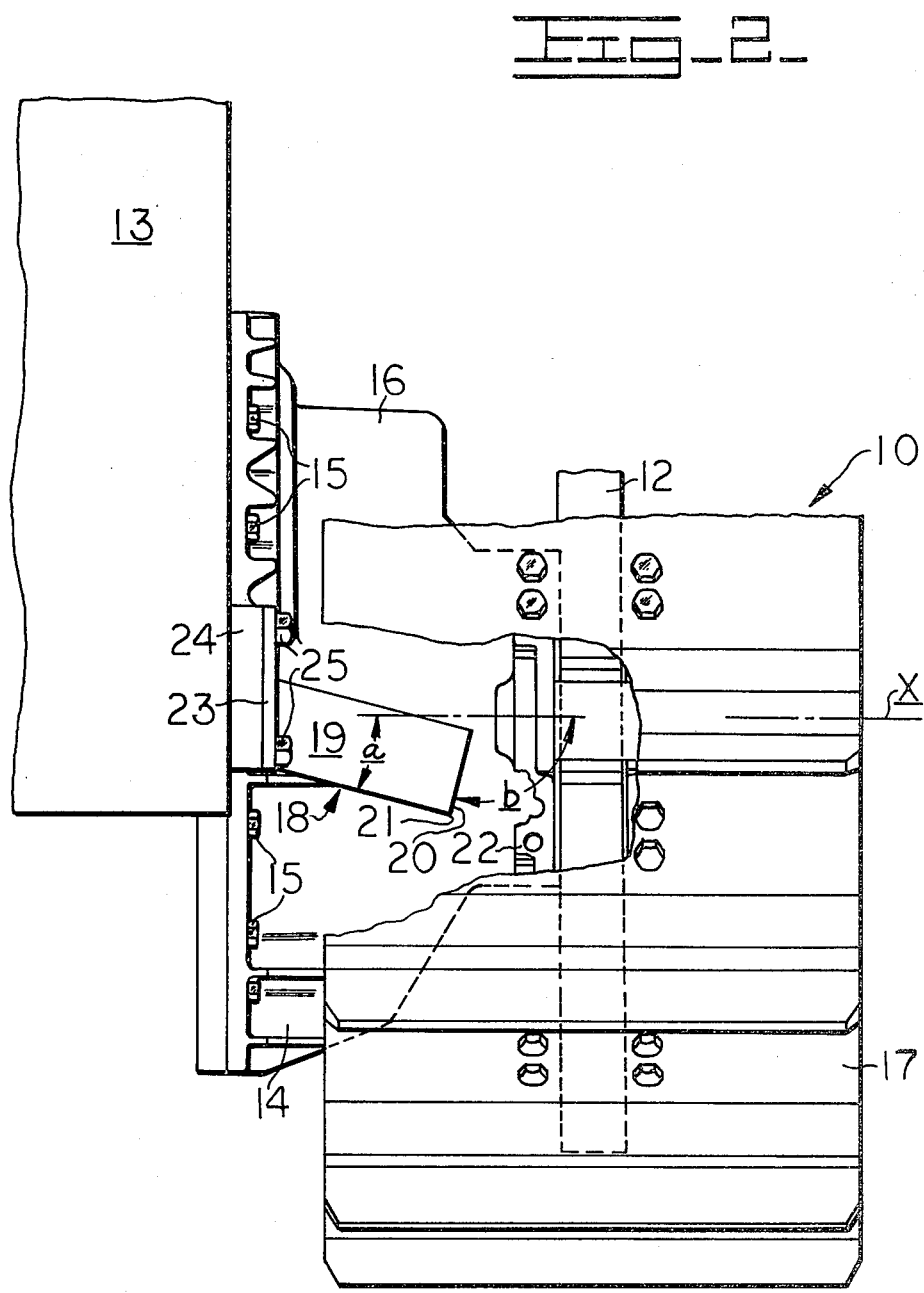
FIG. 2 is a rear elevational view of the structures illustrated in FIG. 1.

As shown in FIG. 2, a bevel gear case 13, suitably secured to the main frame of the vehicle and forming an integral part thereof for purposes of this invention, has a final drive housing 14 suitably secured thereto by a plurality of circumferentially disposed bolts 15. Housing 14 is suitably configured to provide internal clearances for the various gears and drive mechanisms employed in the final drive, such as illustrated by hollow protuberance 16 formed integrally therewith. It can be seen in FIG. 1 that such protuberance is spaced radially inwardly with respect to track shoes 17 of the endless track assembly to define a relatively narrow clearance C to induce the compaction of dirt and other material therebetween.

This invention provides a striker bar means 18 secured to housing 13 (or otherwise directly secured to the main or track roller frame of the vehicle or to another integrated structural component thereof) for preventing the ingress of such materials into clearance C. The striker bar means preferably comprises a thin rectangular flat plate or blade 19 disposed at least generally vertically (FIG. 1) and extending outwardly and downwardly at an acute angle a relative to rotational axis X of sprocket 12. Such angle is preferably selected from the range of from 5° to 45° (illustrated as approximating 15°) to aid in the deflection of material, especially large rocks, inwardly towards the main frame of the vehicle and away from track assembly 10.

The blade is disposed internally of the track assembly and preferably terminates at its outer straight edge 20 and lower corner 21 closely adjacent to an articulated link assembly 22 thereof, as well as track shoes 17 and sprocket 12. Edge 20 extends downwardly and inwardly towards the main frame of the vehicle to define an obtuse angle relative to axis X, preferably selected from the range of from 90° to 135°. The inboard end of the blade is welded or otherwise suitably secured in cantilevered relationship on a triangularly-shaped base plate 23 (FIG. 1). The base plate is releasably attached to a support block 24 welded or otherwise suitably secured to a lower rear corner of housing 13.

As suggested above, blade 19, as well as its supporting plate 23 and block 24, could be otherwise suitably attached to the main or track roller frame of the vehicle directly or to other attendant structures secured thereto to place the blade in a strategic location adjacent to the track assembly and sprocket for cleaning purposes. The blade is preferably disposed vertically to be at least approximately coincident horizontally with rotational axis X of the sprocket. Also, the blade could be placed adjacent to another annular member rotatably mounted on the vehicle, such as the idler supporting the forward end of track assembly 10.

In operation and assuming clockwise movement of the track assembly about sprocket 12 in FIG. 1, it should be noted that corner 21 of blade 19 will intersect any materials carried thereby. Such materials will be broken-up and will tend to drop downwardly and inwardly away from the track assembly. The edges of blade 19, adjacent the corner 21, are preferably surface hardened to increase the life expectancy thereof.

I claim:

1. In a track-type vehicle of the type comprising a frame, an endless track assembly mounted on said frame, a sprocket motivating said track assembly and a stationary structural member secured to said frame and extending outwardly therefrom in close proximity to said track assembly to define a narrow clearance therebetween, the invention comprising striker bar means secured on said vehicle and extending outwardly therefrom to between said track assembly and said sprocket adjacent to said clearance and in close proximity to said track assembly for breaking-up materials carried by said track assembly thereby towards said narrow clearance.

2. The vehicle of claim 1 wherein said striker bar means constitutes a single blade disposed in cantilevered relationship on said frame.

3. The vehicle of claim 2 wherein said blade constitutes a thin flat plate.

4. The vehicle of claim 2 wherein said blade is at least approximately vertically disposed.

5. The vehicle of claim 1 wherein said blade is vertically disposed at least approximately coincident with the rotational axis of said annular member.

6. The vehicle of claim 1 wherein said blade further extends downwardly relative to the rotational axis of said annular member to form an acute angle therebetween.

7. The vehicle of claim 6 wherein said acute angle is selected from the range of from 15° to 45°.

8. The vehicle of claim 1 wherein an outer edge of said blade is straight and extends downwardly and inwardly towards said frame to define an obtuse angle relative to the rotational axis of said annular member.

9. The vehicle of claim 8 wherein said obtuse angle is selected from the range of from 90° to 135°.

10. The vehicle of claim 9 wherein said blade constitutes a thin and generally rectangular plate.

11. The vehicle of claim 2 wherein said blade is secured on a support bracket releasably attached to said frame.

* * * * *

UNITED STATES PATENT OFFICE
CERTIFICATE OF CORRECTION

Patent No. 3,976,337      Dated August 24, 1976

Inventor(s) KETTETH E. VAUGHN

It is certified that error appears in the above-identified patent and that said Letters Patent are hereby corrected as shown below:

Column 3, line 1, "1" should be -- 2 --.

Column 3, line 3, "annular member" should be -- sprocket --.

Column 3, line 4, "1" should be -- 2 --.

Column 3, line 6, "annular member" should be -- sprocket --.

Column 3, line 10, "1" should be -- 2 --.

Column 4, line 2, "annular member" should be -- sprocket --.

Signed and Sealed this

Thirteenth Day of June 1978

[SEAL]

Attest:

RUTH C. MASON
Attesting Officer

DONALD W. BANNER
Commissioner of Patents and Trademarks